United States Patent [19]

Dennis

[11] Patent Number: 4,704,708
[45] Date of Patent: Nov. 3, 1987

[54] ACOUSTIC BOREHOLE LOGGING TOOL

[75] Inventor: Charles L. Dennis, Dallas, Tex.

[73] Assignee: Mobil Oil Corporation, New York, N.Y.

[21] Appl. No.: 784,078

[22] Filed: Oct. 4, 1985

[51] Int. Cl.⁴ .............................................. G01V 1/40
[52] U.S. Cl. .................................................... 367/25
[58] Field of Search .................. 367/25, 35, 152, 166, 367/171; 181/104, 105

[56] References Cited

U.S. PATENT DOCUMENTS

| | | | |
|---|---|---|---|
| 2,411,541 | 11/1946 | Hayes | 367/171 |
| 2,481,068 | 9/1949 | Best | 367/152 |
| 2,913,602 | 11/1959 | Joy | 367/166 |
| 3,378,097 | 4/1968 | Straus et al. | 181/0.5 |
| 3,434,563 | 3/1969 | Zemanek, Jr. | 181/0.5 |
| 3,550,075 | 12/1970 | Hilchie et al. | 340/15.5 |

Primary Examiner—Thomas H. Tarcza
Assistant Examiner—Ian J. Lobo
Attorney, Agent, or Firm—Alexander J. McKillop; Michael G. Gilman; George W. Hager, Jr.

[57] ABSTRACT

An acoustic borehole logging tool employs at least one transducer for directionally transmitting and receiving bursts of acoustic energy into the formations surrounding a borehole. The transducer is mounted in a compartment within the tool which is filled with a coupling liquid. A window in the periphery of the compartment consists of a material having a thickness which maximizes the signal-to-noise ratio of the acoustic energy for the particular wavelength of acoustic energy being transmitted.

6 Claims, 2 Drawing Figures

ACOUSTIC BOREHOLE LOGGING TOOL

BACKGROUND OF THE INVENTION

In U.S. Pat. No. 3,369,626, there is disclosed an acoustic borehole logging technique and system wherein the walls of a borehole are scanned periodically with acoustic energy for obtaining information of interest. In one embodiment, a single transducer which acts both as a transmitter and receiver is rotated in the borehole and periodically actuated to produce acoustic pulses which are applied to the borehole wall. Reflected energy is detected by the transducer between acoustic pulses and converted into receiver signals which are employed to intensity modulate the electron beam of an oscilloscope which is swept across the screen of the oscilloscope once for each rotation of the transducer. Successive traces are produced representative of the borehole wall anomalies or fractures as sensed by the rotating transducer. Each successive trace is photographed by suitable means for the production of a two-dimension, flat record of the surface of the borehole wall.

In one embodiment, the modulating signals have amplitudes dependent upon the energy of reflected acoustic pulses detected whereby the resulting picture has tones of white, gray, and black. The tones of the picture primarily represent the type of reflecting surface, i.e., weak or strong, or the absence of a reflecting surface if fractures are present. Such pictures, hence, are very useful in locating and defining fractures in the formations.

Borehole logging tools generally employed in carrying out such an acoustic logging technique have employed windows in the periphery of the logging tool in juxtaposition with the acoustic transducer and through which acoustic energy is transmitted and received by the transducer. This window preferably consists of a material that is substantially transparent to the transmission of acoustic energy. For example, U.S. Pat. No. 3,550,075 describes such a window as being a rubber boot. U.S. Pat. No. 3,378,097 describes such a window as being of a flexible, neoprene material or a hard, acoustically opaque material. U.S. Pat. No. 3,434,563 describes such a window as being of a 0.05" hycar rubber sleeve. One of the biggest problems in designing this window has been in providing for maximum signal transmission and signal-to-noise ratio. The present invention is, therefore, directed to solving this problem by providing for a new and improved window which serves to so maximize such signal transmission and signal-to-noise ratio.

SUMMARY OF THE INVENTION

The present invention is directed to an acoustic borehole logging tool for use in obtaining information on the configuration of the borehole wall or anomalies in the subsurface formations surrounding the borehole.

More particularly, an elongated borehole logging tool employs at least one transducer for directionally transmitting bursts of acoustic energy into the formations surrounding the borehole and for receiving acoustic energy being reflected back to the borehole tool as an indication of the condition of the borehole wall or surrounding subsurface formations. The transducer is mounted in a compartment within the tool which is filled with a coupling liquid. A window in the periphery of the compartment consists of a material having a thickness equal to a fractional part of the wavelength of acoustic energy so as to provide for optimum borehole logging measurements.

In a more specific aspect, the window consists of Teflon having a thickness in the order of $\frac{1}{2}$ of the wavelength of the acoustic energy being transmitted so as to maximize signal-to-noise ratio.

DESCRIPTION OF THE PREFERRED EMBODIMENT

In accordance with the present invention, there is provided a borehole logging tool having a transducer which transmits bursts of acoustic energy through a window in the periphery of the tool having a thickness equal to a fractional part of the wavelength of acoustic energy so as to provide for optimum borehole logging measurements.

Figure 1:
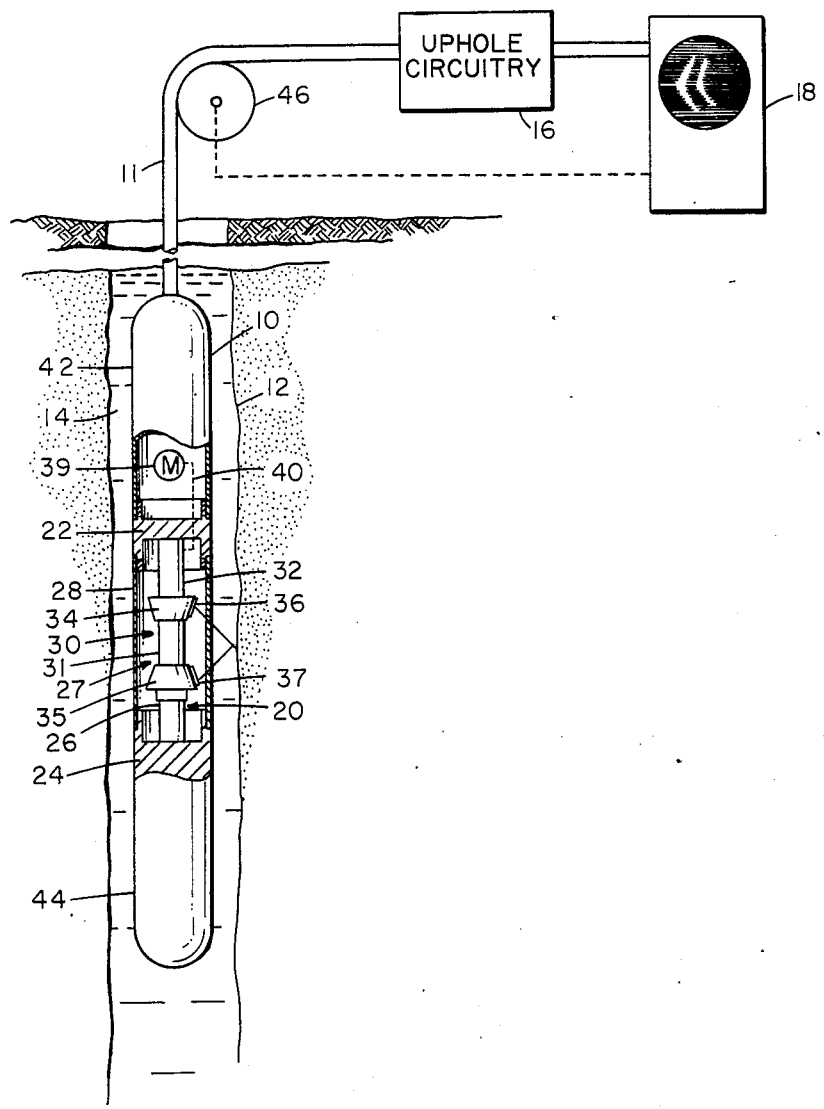
FIG. 1 is a schematic illustration, partly in section, of an acoustic energy borehole logging tool employing the present invention.

Before describing the present invention in detail, a description will be set forth of a borehole logging tool with which the invention may be utilized. Referring now to FIG. 1, there is illustrated an elongated logging tool 10 which is shown as extended from a cable 11 within a borehole 12. The borehole 12 is filled with a fluid, such as drilling mud 14. The logging system also includes remote circuitry 16 at the surface and a suitable readout means such as a cathode ray oscilloscope 18 upon which a facsimile of the wall of the borehole may be displayed.

The logging tool 10 is shown with parts broken away in order to illustrate schematically the transducer assembly thereof. The logging tool includes a support structure 20 which comprises upper and lower panels 22 and 24, respectively, and a reduced connecting member 26 extending between the panels. The panels 22 and 24 define a transducer compartment 27 within the tool within which the acoustic transducers are mounted. The transducer compartment is provided with a peripheral window 28 which is relatively transparent to acoustic energy and is the subject of the present invention, as will be described in more detail hereinafter. The transducer compartment also is filled with a suitable coupling liquid which desirably has an acoustic impedance close to that of the borehole mud 14 and the window 28.

A transducer assembly 30 is mounted within compartment 27 for rotational movement about the connecting member 26. The transducer assembly includes a carriage member 31, which may be a cylindrical tube, and at least two transducer supports 34 and 35 which are secured to the carriage member. Acoustic transducers 36 and 37 are mounted in the supports 34 and 35, respectively, at longitudinally spaced positions in the compartment 27. Transducers 36 and 37 are directional electroacoustic transducers and are inclined at an angle with respect to each other in order to provide a beam focus point at a desired point laterally of the transducers. By way of example, transducers 36 and 37 may be piezoelectric or bender-type transducers. While separate transmitting and receiving transducers have been described in conjunction with FIG. 1, it is to be understood that a single transducer may be employed with proper gating for transmission and reception modes of operation.

The logging tool also is provided with a prime mover such as an electric motor 39. A drive mechanism indicated by broken line 40 interconnects the prime mover and the carriage member so that the transducer assembly may be rotated with respect to the support structure 20. The upper and lower sections 42 and 44 of the logging tool may be provided with suitable centralizing means (not shown) for positioning the tool concentrically within the borehole.

In operation of the logging system illustrated in FIG. 1, the logging tool 10 is lowered into the borehole 12 and the prime mover 39 is energized to rotate the transducer assembly 30 about the connecting member 26. The transmitting transducer 36 is excited to generate pulses of acoustic energy which travel predominantly in a confined, narrow beam path toward the wall of the borehole 12. For example, the transducers 36 and 37 may directionally transmit and receive, respectively, acoustic signals having a predominant frequency within the range of a few hertz to one-to-two megahertz. The transducers may be rotated at 100-400 revolutions per minute, and the signal pulses may be generated at a repetition frequency on the order of 2,000 times per second. The acoustic pulses reflected from the wall of the borehole are detected by the receiving transducer 37 and converted into representative signals, such as electric pulses. These signals then are transmitted to the surface via suitable communicaton channels in the cable 11 where they are received by the remote circuitry 16 which functions in respect to the received signals to intensity modulate the beam of the cathode ray oscilloscope 18. The logging tool 10 also is provided with position indicating means (not shown) which functions to transmit a position signal to the surface which is representative of the angular position of the transducer assembly 30 within the borehole. This position signal operates to horizontally sweep the oscilloscope beam across the face of the oscilloscope in proportion to the angular position of the transducer assembly 30 within the borehole. As the logging tool 10 is moved upwardly through the borehole, a depth indicating means, such as a measuring sheave 46 which is rotated by the cable 11, generates a depth signal which functions to control the sweep of the oscilloscope beam vertically across the face of the oscilloscope.

From the foregoing description, it will be recognized that as the logging tool is moved upwardly or downwardly through the borehole and the transducer assembly 30 rotated, a display is produced on the face of the oscilloscope which is correlated with the depth of the logging tool within the borehole. Whenever the beam of acoustic pulses generated by the transmitting transducer 36 encounters an anomaly, such as a fracture in the borehole wall, the beam is not reflected directly back to the receiving transducer 37. When a pulse is not received by the transducer 37, the surface circuitry does not receive a representative signal to intensity modulate the beam of the oscilloscope and a gap is indicated on the face of the oscilloscope. The oscilloscope face thus presents a display of anomalies found in the wall of the borehole.

While the acoustic logging system has thus far been described with regard to surveying the face of the borehole, it will be recognized that the system may be utilized in surveying the adjacent subterranean formations. For example, the logging system may be utilized to determine the orientation of the anomalies, such as fractures, in the subterranean formations at locations spaced from the wall of the borehole. In utilizing the system to log the adjacent formations, it is desired to utilize transducers which directionally transmit and receive within a lower frequency range than that heretofore described. For example, the transducers 36 and 37 may transmit and receive, respectively, a directional acoustic signal having a predominant frequency within the kilohertz range. In this case, it will also be necessary to utilize a lower repetition frequency for pulse transmission and the transducers should be rotated at a lower speed. Thus, the repetition frequency may be 50 pulses per second, and the transducers may be rotated at one rpm.

Having now described a borehole logging tool with which the present invention may be utilized, a more detailed description of such invention will now be set forth. As previously noted, the present invention is directed to a new and improved window 28 for maximizing the transmission of acoustic energy from the transmitting transducer 36 and to the borehole wall and surrounding formations and to maximize the transmission of acoustic energy to the receiving transducer 37 from the borehole wall and surrounding formations. Further, the present invention is directed to a new and improved window 28 which also provides for maximum signal-to-noise ratio of the transmitted and received acoustic energy signals.

Figure 2:
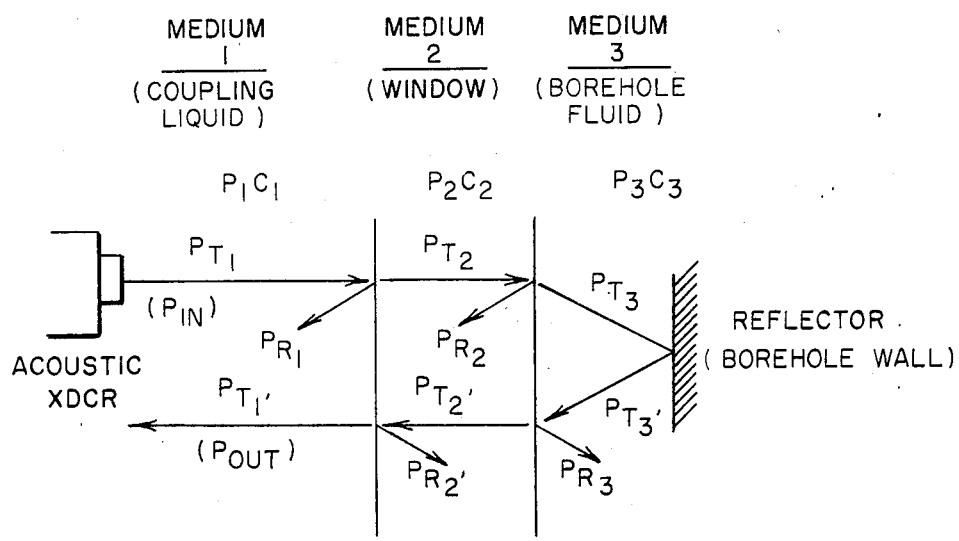
FIG. 2 is a graphic illustration of acoustic energy transmission from the borehole logging tool of FIG. 1 when located in a fluid-filled borehole.

Referring to FIG. 2, there is shown the three medias through which the acoustic energy travels from and to the acoustic energy transducer. The first medium (Medium 1) is the coupling liquid (i.e., oil) inside the transducer compartment; the second medium (Medium 2) is the window itself; and the third medium (Medium 3) is the borehole fluid (i.e., mud). As can be seen, both a transmitted wave, $P_T$, and a reflected wave, $P_R$, are present on both sides of the boundaries between each of these three medias. The sound power coefficient through these three media is as follows:

$$\alpha_t = \frac{4\rho_3 C_3 \rho_1 C_1}{(\rho_3 C_3 + \rho_1 C_1)^2 \cos^2\theta + (\rho_2 C_2 + \rho_3 C_3 \rho_1 C_1/\rho_2 C_2)^2 \sin^2\theta} \quad (1)$$

where $\rho_1$ = Density of Medium 1
$C_1$ = Acoustic Velocity of Medium 1
$\rho_2$ = Density of Medium 2
$C_2$ = Acoustic Velocity of Medium 2
$\rho_3$ = Density of Medium 3
$C_3$ = Acoustic Velocity of Medium 3
$\theta = 2\pi fL/C_2$, where f = frequency of acoustic wave and L = thickness of Medium 2. This equation describes the ratio ($\alpha_t$) of the acoustic power transmitted into Medium 3 to the incident acoustic power in Medium 1. For signal detection work, the interest is in acoustic pressures because acoustic pressures produce analog electrical signals. The sound power can be related to sound pressure by:

$$\alpha_T = \frac{P_{t3}^2/\rho_3 C_3}{P_{T1}^2/\rho_1 C_1} \quad (2)$$

solving for $P_{T3}/P_{T1}$:

$$\frac{P_{T3}}{P_{T1}} = \alpha_t \cdot \frac{\rho_3 C_3}{\rho_1 C_1} \quad (3)$$

Considering: (a) the reciprocity apparent in Equation (1) due to the symmetry of variables $\rho_1 C_1$ and $\rho_3 C_3$ and (b) the two-way acoustic transmission as shown in FIG. 2, the following results:

$$\frac{P_{out}}{P_{in}} = \frac{P_{T3}}{P_{T1}} \cdot \frac{P_{T1}'}{P_{T3}} = \sqrt{\alpha_t \cdot \frac{\rho_3 C_3}{\rho_1 C_1}} \cdot \sqrt{\alpha_t \cdot \frac{\rho_1 C_1}{\rho_3 C_3}} = \alpha_t \quad (4)$$

Thus, the one-way acoustic power transmission is equal to the two-way pressure transmission.

This coefficient, $\alpha_t$, emphasizes that both the coupling fluid surrounding the transducer within the logging tool and the fluid filling the borehole must be take into account when selecting the window material and window thickness for maximizing the acoustic energy transmission and signal-to-noise ratio. Measurements of signal transmission and noise were carried out for several different materials and thicknesses in the presence of both the coupling and borehole fluids, and a signal-to-noise ratio was determined for the acoustic energy signal utilized. Of all the materials tested, Teflon produced the highest signal-to-noise ratio. However, Teflon was found to be most sensitive to material thickness. TABLE I summarizes these measurements for various thicknesses of Teflon with an acoustic energy signal of 437 kilohertz and with three different borehole fluids (i.e., H$_2$O, 12 ppg. mud and 16 ppg. mud). The thicknesses utilized were 1/16 fractional parts of the wavelength ($\lambda$) of the 437 kilohertz signal.

TABLE I

TEFLON
TEST FREQUENCY = 437 KHz
FLAT TRANSDUCER

| | WAVELENGTH ($\lambda$) | | | | | | | | | |
|---|---|---|---|---|---|---|---|---|---|---|
| | 3/16 | 1/4 | 5/16 | 3/8 | 7/16 | 1/2 | 9/16 | 5/8 | 11/16 | 3/4 |
| THICKNESS (INCHES) | .025 | .033 | .043 | .050 | .058 | .067 | .075 | .083 | .091 | .100 |
| H$_2$O | | | | | | | | | | |
| SIG | 1.50 | 50 | 58 | 60 | 66 | 62 | 55 | 55 | 52 | 54 |
| NOISE | 1.5 | 10 | 6 | 4 | .4 | 1 | 2 | 4 | 8 | 10 |
| S/N | 33 | 5 | 9.7 | 15 | 165 | 62 | 27.5 | 13.8 | 6.5 | 5.4 |
| 12 POUND MUD | | | | | | | | | | |
| SIG | 4.5 | 5 | 6 | 6 | 6.2 | 6.5 | 5 | 5.2 | 5.8 | 5.2 |
| NOISE | 1 | 1 | 1 | 3 | 1 | .4 | .75 | 1.5 | 2.2 | 2 |
| S/N | 4.5 | 5 | 6 | 2 | 6.2 | 16.3 | 6.7 | 3.5 | 2.6 | 2.6 |
| 16 POUND MUD | | | | | | | | | | |
| SIG | .48 | .8 | .6 | .54 | .6 | .76 | .6 | .8 | .9 | .54 |
| NOISE | .6 | 6 | 1 | .6 | .6 | .17 | .6 | 1 | 1.5 | 1.5 |
| S/N | .8 | .13 | .6 | .9 | 1 | 4.5 | 1 | .8 | .6 | .36 |

As can be seen from TABLE I, a thickness in the range of $7\lambda/16$ to $9\lambda/16$ produces maximum signal-to-noise ratio for all cases of borehole fluid, with $\lambda/2$ being an optimum thickness. Consequently, regardless of the borehole environment with respect to the type of borehole fluid from borehole to borehole, a window 28 comprising Teflon with a thickness equal to a select fractional part of the wavelength, $\lambda$, of the acoustic energy signal being transmitted will provide for the desired maximization of signal-to-noise ratio or signal transmission, respectively.

Having now described the present invention in conjunction with a preferred embodiment, it is to be understood that various modifications and alterations may be apparent from the spirit and scope of the invention as set forth in the appended claims.

I claim:

1. Using a borehole logging tool having
   an elongated borehole tool for inserting into a fluid-filled borehole,
   at least one transducer located in said tool for directionally transmitting bursts of acoustic energy into the formations surrounding said borehole and for receiving said acoustic energy being reflected back to said borehole tool as an indication of the condition of said surrounding formations and of the borehole wall,
   a compartment in said tool within which said transducer is mounted,
   a coupling liquid filling said compartment, and
   a window in the periphery of said compartment, a method for determining the thickness of the particular material being utilized for said window, comprising the steps of:
   (a) measuring the acoustic energy signal transmission through said window for a plurality of differing window thicknesses,
   (b) measuring the noise transmission through said window for each of said plurality of differing window thicknesses,
   (c) determining the ratio of the signal-to-noise transmissions from steps (a) and (b) and
   (d) selecting the material thickness for said window that yields the largest signal-to-noise ratio.

2. The method of claim 1 wherein steps (a)–(d) are carried out for a plurality of differing borehole fluids.

3. The method of claim 1 wherein said differing borehole fluids range in consistency from water to 16 pound mud.

4. The method of claim 1 wherein steps (a)–(d) are carried out for a plurality of differing window materials.

5. The method of claim 4 wherein at least one of said plurality of differing window materials is teflon.

6. The method of claim 1 wherein steps (a)–(d) are carried out for a plurality of differing acoustic energy transmissions having a predominant frequency in the range of one-to-two hertz to one to two megahertz.

* * * * *